United States Patent [19]

Nakajima

[11] Patent Number: 4,649,334

[45] Date of Patent: Mar. 10, 1987

[54] METHOD OF AND SYSTEM FOR CONTROLLING A PHOTOVOLTAIC POWER SYSTEM

[75] Inventor: Kihei Nakajima, Yokohama, Japan

[73] Assignee: Kabushiki Kaisha Toshiba, Kanagawa, Japan

[21] Appl. No.: 788,744

[22] Filed: Oct. 17, 1985

[30] Foreign Application Priority Data

Oct. 18, 1984 [JP] Japan .................. 59-217326
Jan. 25, 1985 [JP] Japan .................. 60-11900

[51] Int. Cl.$^4$ .............................................. G05F 5/00
[52] U.S. Cl. .................................... 323/299; 323/906; 363/95
[58] Field of Search ............... 323/299, 303, 906; 363/95, 97, 130, 135, 137; 324/433, 437

[56] References Cited

U.S. PATENT DOCUMENTS

| 4,390,940 | 6/1983 | Corbefin et al. ............ 323/906 |
| 4,404,472 | 9/1983 | Steigerwald .............. 323/906 |
| 4,494,180 | 1/1985 | Streater et al. ............ 323/906 |
| 4,510,434 | 4/1985 | Assbeck et al. ............ 323/906 |

FOREIGN PATENT DOCUMENTS 29743 6/1981 European Pat. Off. ............ 323/906

OTHER PUBLICATIONS

O. Wasynezuk, "Dynamic Behavior of A Class of Photovoltaic Power Systems", pp. 1-7, IEEE 1983.

Primary Examiner—Peter S. Wong
Assistant Examiner—Judson H. Jones
Attorney, Agent, or Firm—Schwartz, Jeffery, Schwaab, Mack, Blumenthal & Evans

[57] ABSTRACT

In a method of and a system for controlling a photovoltaic power system including a solar battery and a power converter receiving the output of the solar battery, the voltage of the solar battery is kept at a voltage reference which is determined in accordance with the operating condition of the system thereby to maximize the power of the solar battery. Operating mode is switched between a first mode in which the voltage reference is periodically decreased and a second mode in which the voltage reference is periodically increased. The switching between the first and the second mode is effected in accordance with the direction of change of the power and the voltage of the solar battery. Where there is a reactance between the solar battery and the point at which the voltage or the current is detected, or a time lag element in a voltage detector or a current detector, an arrangement may be provided to compensate detection error due to the reactance or the time lag element.

20 Claims, 18 Drawing Figures

METHOD OF AND SYSTEM FOR CONTROLLING A PHOTOVOLTAIC POWER SYSTEM

BACKGROUND OF THE INVENTION

The present invention relates to a method of and a system for controlling a photovoltaic power system comprising a solar battery in such a way as to maximize the output power of the solar battery.

Importance of solar batteries is increasing from the viewpoint of effective utilization of energy and it is expected that solar batteries will find wide applications such as domestic use, linking with electric power systems. Solar batteries convert solar energy into electrical energy. For efficient utilization, it is desirable that the output power of the solar batteries be kept maximized regardless of variation in the atmospheric conditions.

Figure 1:
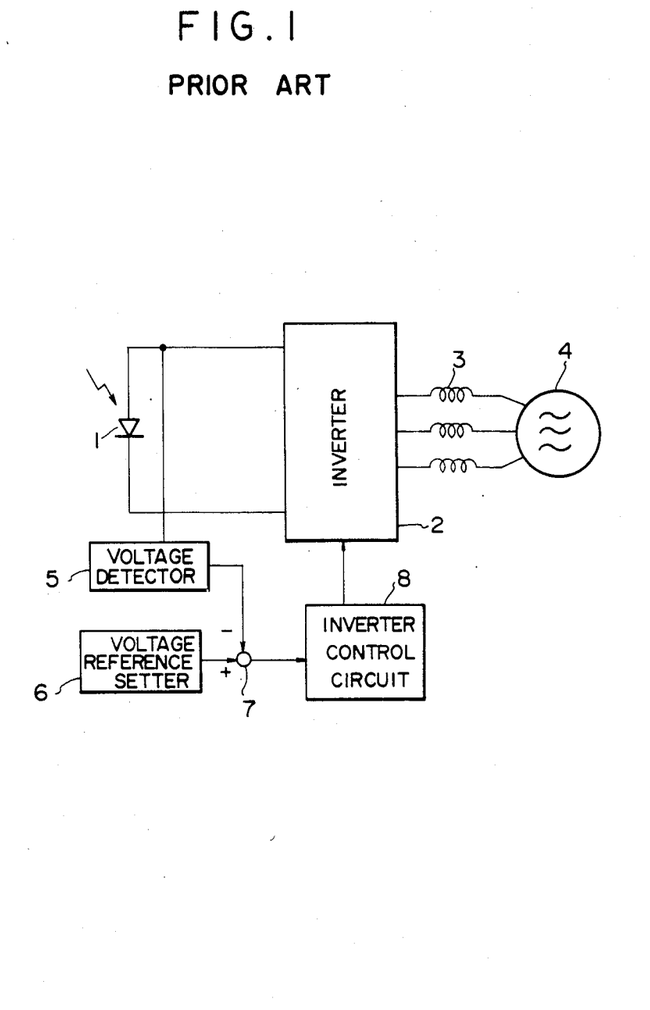
FIG. 1 is a block diagram showing a photovoltaic power system provided with a conventional control system.

FIG. 1 shows an example of photovoltaic power system comprising a solar battery 1 and a voltage-type inverter. The output of the inverter 2 is connected through coupling reactors 3 to AC power source 4 which may for example be a power distribution network. The output voltage of the solar battery as detected by a voltage detector 5 and a voltage reference from a voltage reference setter 6 are compared at a subtractor 7, and the deviation as determined by the subtractor 7 is applied to an inverter control circuit 8 which controls the inverter 2 in such a manner as to make the deviation smaller (closer to zero) or to keep the deviation at zero. When the detected voltage is larger than the voltage reference the inverter 2 is so controlled as to increase its output power. When, on the contrary, the detected voltage is smaller than the voltage reference the inverter 2 is controlled as to reduce its output power. In this way, the deviation of the detected voltage from the voltage reference is made smaller.

In a prior art system, the voltage reference is determined to maximize the output power in accordance with a characteristic of the solar battery. For instance it is assumed that, for a given insolation (light intensity), the voltage maximizing the output power is constant or is linearly related to the current, and the voltage reference is determined on such an assumption. Where the voltage is assumed to be linearly related to the current, a detected current value may be inputted to the voltage reference setter 6. In many of the solar batteries, the maximum output power can be nearly perfectly tracked.

In another conventional method, an additional solar battery for monitoring the insolation is used to optimize the voltage reference for the detected insolation. The monitoring solar battery may be opened or short-circuited and the open voltage or the short-circuit current may be used to determine the voltage reference.

In the various methods described, it is essential that the characteristic of the solar battery is known, at least to some extent. Moreover, the maximum output power may not be accurately tracked. This is because the voltage and current of a solar battery depend not only on the insolation but also on temperature. Furthermore, when a solar battery is exchanged, the voltage reference may have to be changed because of a difference between their characteristics.

SUMMARY OF THE INVENTION

An object of the invention is to eliminate the above-described problems.

Another object of the invention is to enable accurate tracking of the maximum output power regardless of change in various atmospheric conditions.

A further object of the invention is to enable accurate tracking of the maximum output power even where there is a reactance between the solar battery and the point at which the voltage or the current is detected for use in tracking control or a time lag element in the voltage detector or the current detector.

According to the invention, there is provided a method of and a system for controlling a photovoltaic power system including a solar battery and a power converter receiving the output of the solar battery. The voltage of the solar battery is kept at a voltage reference which is determined in accordance with the operating condition of the system thereby to maximize the power of the solar battery. Operating mode is switched between a first mode in which the voltage reference is periodically decreased and a second mode in which the voltage reference is periodically increased. The switching between the first and the second mode is effected in accordance with the direction of change of the power and the voltage of the solar battery. Where there is a reactance between the solar battery and the point at which the voltage or the current is detected, or a time lag element in a voltage detector or a current detector, an arrangement may be provided to compensate detection error due to the reactance or the time lag element.

BRIEF DESCRIPTION OF THE DRAWINGS

In the accompanying drawings.

DETAILED DESCRIPTION OF THE PREFERRED EMBODIMENTS

Figure 2:
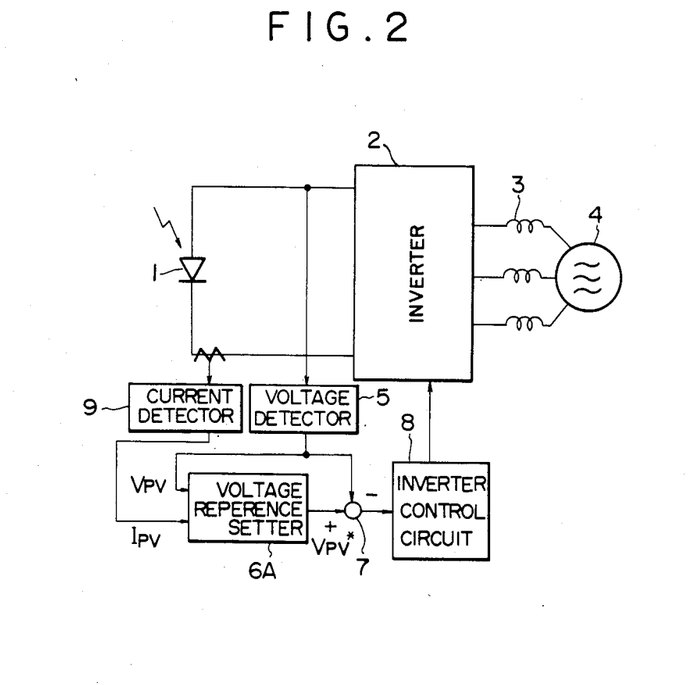
FIG. 2 is a block diagram showing a photovoltaic power system provided with a control system of an embodiment of the invention.

FIG. 2 shows a photovoltaic system provided with an embodiment of a control system according to the invention. The same reference numerals as in FIG. 1 denote the same or similar members. The system of FIG. 2 differs from the system of FIG. 1 in that it is provided with a current detector 9 detecting the output current of the solar battery 1 and the voltage reference setter 6A is of a different construction as will now be described in detail.

Figure 3:
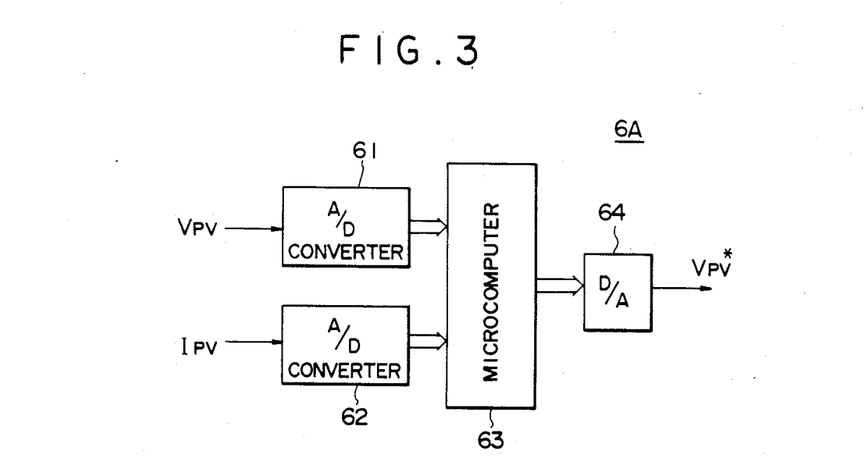
FIG. 3 is a block diagram showing an example of the voltage reference setter 6A shown in FIG. 2.

FIG. 3 shows an example of internal hardware structure of the voltage reference setter 6A. As illustrated, it comprises A/D (analog to digital) converters 61 and 62 respectively digitizing the output Vpv of the voltage detector 5 and the output Ipv of the current detector 9 to produce digital signals respectively indicating the detected voltage and the detected current. The digital signals from the A/D converters 61 and 62 are inputted to a microcomputer 63, which calculates a voltage reference Vpv* according an algorithm which will be described later and produces a digital signal indicating the calculated voltage reference, which is then converted at a D/A (digital to analog) converter 64 into an analog signal indicating the calculated voltage reference Vpv* and is produced as the output (voltage reference signal) of the voltage reference setter 6A.

Figure 4:
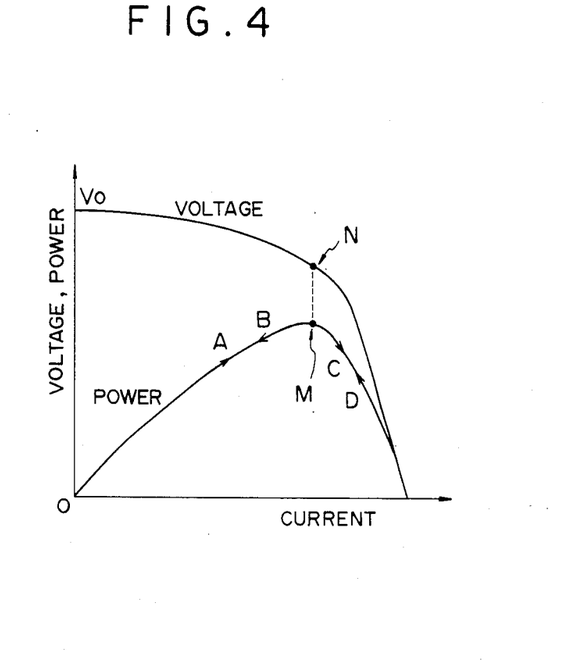
FIG. 4 is a diagram showing characteristics of a typical solar battery.

The algorithm for the determination of the voltage reference by the microcomputer 63 will now be described. Assume that the solar battery has characteristics as shown in FIG. 4 under given conditions. At point M along the power versus current curve, the output power is the maximum, when the voltage is at point N along the voltage versus current curve. When the atmospheric conditions such as insolation and temperature vary, the characteristic curves also vary. It is however desirable that the operating point be varied so that the output power is kept at the peak of the power curve.

In formulating the algorithm it is assumed that a solar battery has the following fundamental characteristic: namely for a given atmospheric conditions, the voltage is either constant or decrreased when the current is increased.

The voltage reference V* is initially set at the noload voltage Vo and is subsequently reduced by a fixed amount (unit variation) dV every sampling interval. With such successive reduction in the voltage, the output power is gradually increased as indicated by arrow A. The successive reduction of the voltage is continued until the power begins to be decreased as indicated by arrow C. Upon detection of the power decrease, the direction of the change of the voltage is reversed, i.e., the voltage reference begins to be increased step by step every sampling interval. When the direction of the voltage reference variation is altered, the direction of the actual voltage variation and the direction of the power variation will subsequently be altered accordingly. Therefore, the actual voltage begins to be increased and the power begins to be increased as indicated by arrow D. After passage of the maximum point M, the power begins to be decreased as indicated by arrow B while the voltage is kept increased. Upon detection of such a state (power decrease and voltage increase), the direction of the variation in the voltage reference is again reversed. The rest of the operation is the same as is already described above. In other words, the reversal of the direction of the variation in the voltage reference is effected when the actual voltage is decreased and the power is also decreased or when the actual voltage is increased and the power is also decreased. Such reversal of the direction of the variation in the voltage reference and successive variation of the voltage reference every sampling interval are repeated so that the power oscilates about the maximum value and in the vicinity thereof.

Figure 5:
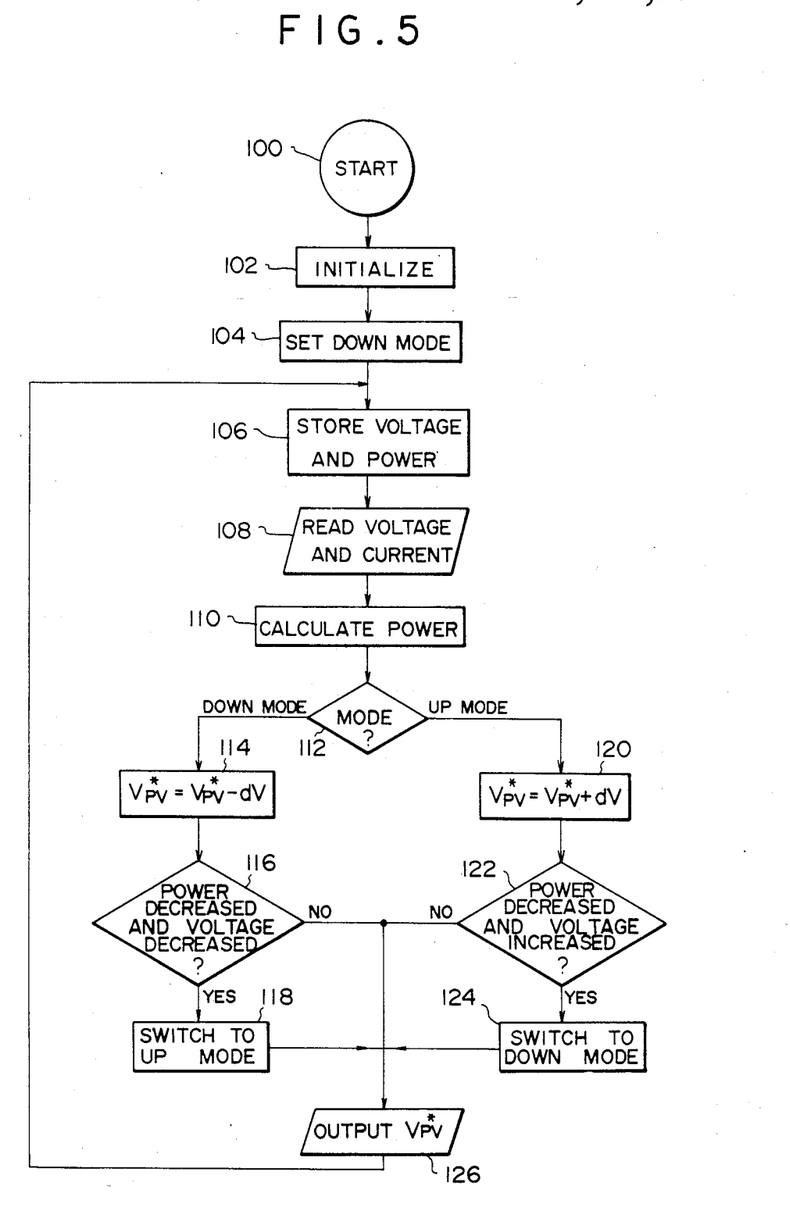
FIG. 5 is a flow chart showing operation of the microcomputer 63 shown in FIG. 3.

FIG. 5 shows the operation for determining the voltage reference according to the above-described algorithm. After start (100) of power maximizing control, the microcomputer is initialized (102), by which the present voltage and the present current are read out and the power is calculated from them. The initial value of the voltage reference Vpv* is set at the voltage as read out. The variation mode is set to be DOWN mode (104) and a flag representing the DOWN mode is set. The initial voltage reference is set at the no-load voltage Vo.

The rest of the steps (106-126) are repeated every sampling interval. First, the voltage and the power at the time of the preceding sampling instant are stored (106). Then, the present values of the voltage and the current are read and stored in a RAM of the microcomputer, not illustrated (108). The power is then calculated by multiplying the present value of the voltage by the present value of the current (110). Subsequently, judgment is made as to whether the variation mode is now the DOWN mode or the UP Mode (112). If it is the DOWN Mode, a fixed value dV is subtracted from the previous value of the voltage reference Vpv* to produce a new voltage reference also denoted by Vpv* (114). It is then judged whether the power and the voltage are both decreased as compared with the previous values (values at the time of the preceding sampling instant) (116). If they are found to be both decreased, the variation mode is switched to UP mode (118) and the voltage reference Vpv* is then outputted (126). Otherwise, the variation mode is not alternated and the new voltage reference Vpv* is outputted (126).

If the variation mode is the UP mode, a fixed value dV is added to the previous voltage reference Vpv* to produce a new voltage reference Vpv* (120). It is then judged whether the power is decreased and the voltage is increased (122). If that is the case, the variation mode is switched to the DOWN Mode (124) and the new voltage reference Vpv* is outputted (126). Otherwise the variation mode is not altered and the voltage reference Vpv* is outputted (126).

The above routine (106-126) is repeated every sampling interval.

By the use of the above described algorithm, the maximum power tracking control is achieved.

The above algorithm is featured by the judgement on the actual values of the voltage and the power in connection with the variation mode. More particularly, during the DOWN mode, judgement is made as to whether the actual values of the power and the voltage are both decreased. During the UP mode, judgement is made as to whether the actual value of the power is decreased and the actual power of the voltage is increased.

Figure 6:
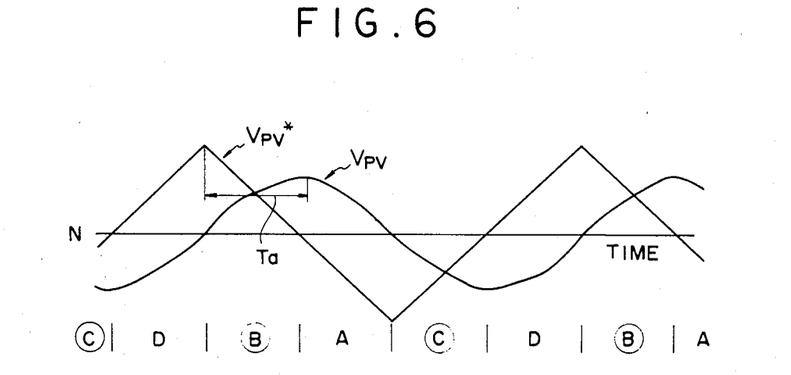
FIG. 6 is a waveform diagram showing the voltage reference and the actual voltage of the solar battery.

Such an algorithm is adopted upon consideration of the delay in the control of the system. More particularly, the actual voltage of the solar battery and the direction in its change do not necessarily coincide with the value of the voltage reference Vpv* and the direction in its change, respectively. For instance, during the DOWN Mode when the voltage reference Vpv* is decreased, the actual voltage may be increased so that the power varies as indicated by arrows B and D. Similarly, during the UP Mode when the voltage reference Vpv* is increased, the actual voltage may be decreased so that the power varies as indicated by arrows A and C. This is illustrated in FIG. 6, where Vpv* represents the voltage reference, and Vpv represent the actual voltage. A, B, C, D correspond to the arrows in FIG. 4 indicating the position and the direction of variation of the power. If the variation mode were reversed solely on the basis of the direction of the power variation, the resultant operation would be unsatisfactory particularly where the control delay as indicated by Td is long.

Figure 7:
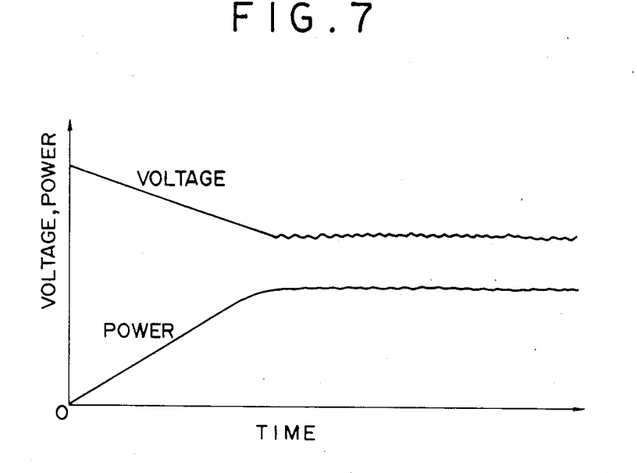
FIG. 7 is a diagram showing how the voltage and the power vary during the initial stage of operation of the photovoltaic power system.

FIG. 7 shows how the voltage and the power are varied and during the initial stage of operation of the photovoltaic power system. As is illustrated, the power is initially zero, and is made to increase by voltage variation. After the power reaches the maximum point, the voltage is made to increase and decrease, i.e., to be perturbed thereby to keep the power tracking the maximum point.

For changing the rate of variation of the voltage, either the sampling period or the step of voltage variation dV may be changed. By adjusting these values (the sampling period and the step of voltage variation) the power fluctuation can be minimized.

For improving the accuracy of detection of the power and the voltage, the A/D converters 61 and 62 of FIG. 3 may be replaced by a voltage/frequency converter producing pulses of a frequency proportional to the input voltage and counting the pulses over a certain time interval to produce a signal indicating the average of the voltage over the above-mentioned "certain time interval." This time interval may be made longer for minimizing effect of high-frequency noises and to increase accuracy. Moreover, the calculation accuracy within the microcomputer 63 may be improved.

In the flow chart of FIG. 5, it was assumed that the initial voltage reference is set at the no-load voltage Vo. The initial voltage reference may alternatively be set closer to a value corresponding to the maximum power under average (or most frequently occurring) conditions.

As has been described, according to the embodiment described, the voltage and the current are detected and the power and the voltage are supervised to provide a voltage reference to maximize the power of the solar battery. In this way, the power is made to track the maximum point regardless of the characteristic of the particular solar battery under control and stable control is ensured even if there is a certain control delay.

Figure 8:
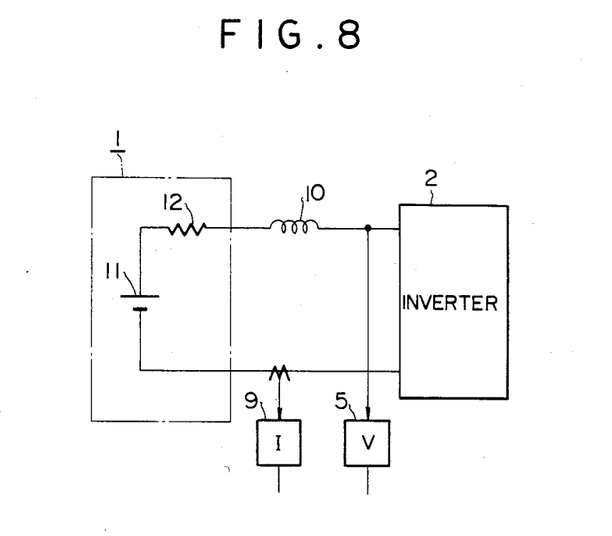
FIG. 8 is a block diagram showing a photovoltaic power system with a reactance between the solar battery and the inverter 2.
Figure 9A:
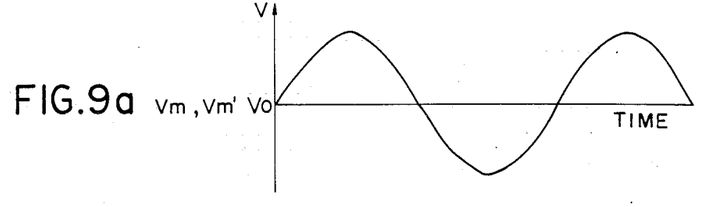
FIGS. 9a-9d are waveform diagrams showing the voltage, the current and the power during oscillation of the voltage reference.
Figure 9B:
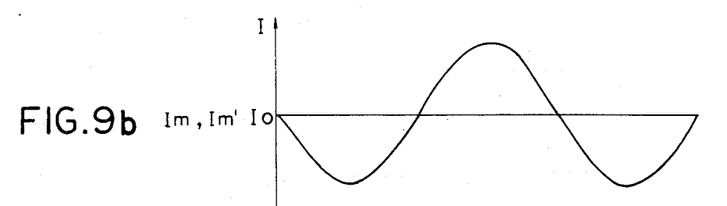
Figure 9C:
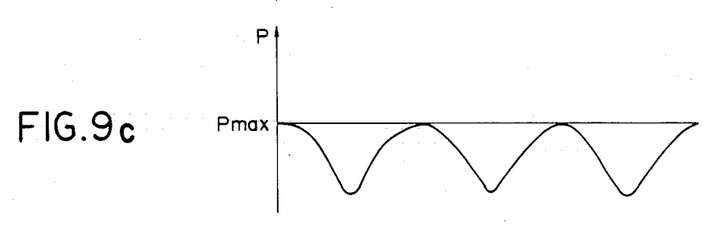
Figure 9D:
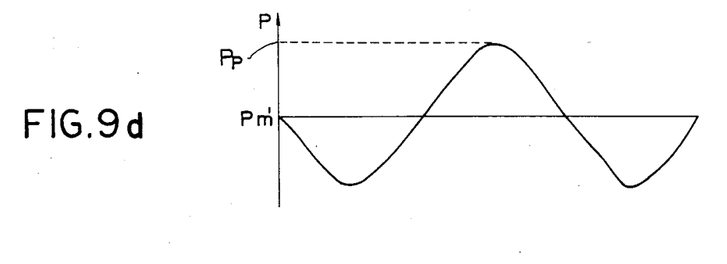
Figure 10:
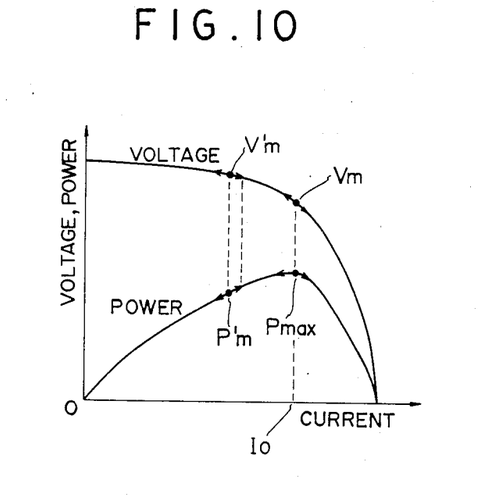
FIG. 10 is a diagram showing two different operating points on the characteristic curves of a solar battery.

The above-described embodiment is however not satisfactory where the inductance between the point at which the voltage is detected and the terminal of the solar battery is substantial as shown in FIG. 8. This may be the case where the power converter is located far from the solar battery. This will be explained in detail. First it is assumed for the sake of comparison that there is no inductance. When the voltage is oscillated as shown in FIG. 9a, the current varies in the opposite phase as shown in FIG. 9b. If the voltage is oscillated to pass a point Vm in FIG. 10 corresponding to the maximum power Pmax, the power varies as shown in FIG. 9c, from which it is seen that the power variation has a frequency twice that of the voltage variation, and the peak value of the power (which coincides with the maximum power Pmax) appears twice in each period of the voltage variation. If, on the other hand, the voltage is oscillated about a point Vm' (FIG. 10) not to pass the point corresponding to the maximum power, the power varies as shown in FIG. 9d, from which it is seen that the power variation has the same frequency as the voltage variation and the peak value Pp of the power (which is smaller than the maximum power Pmax) appears only once in each period of the voltage variation.

Now, let us assume that there is a considerable inductance as shown in FIG. 8 (which may be considered an equivalent circuit of a photovoltaic system having a long distance wiring). In FIG. 8, reference numeral 10 denotes a reactor (which may be considered to represent a total inductance of the long distance wiring). The solar battery 1 is shown to comprise a voltage source 11 and an equivalent resistance 12. In the system of FIG. 8, the magnitude and the phase (relative to the current) of the voltage as detected by the voltage detector 5 differs from those of the actual terminal voltage of the solar battery 1 due to the voltage drop across the reactor 10. As a result, it may happen that the power calculated from the detected voltage and the detected current differs from the actual power at the terminal of the solar battery 1. It is therefore possible that the operating point is erroneously recognized to be oscillating about the maximum power even when the actual operating point is not close to the maximum power.

Figure 11:
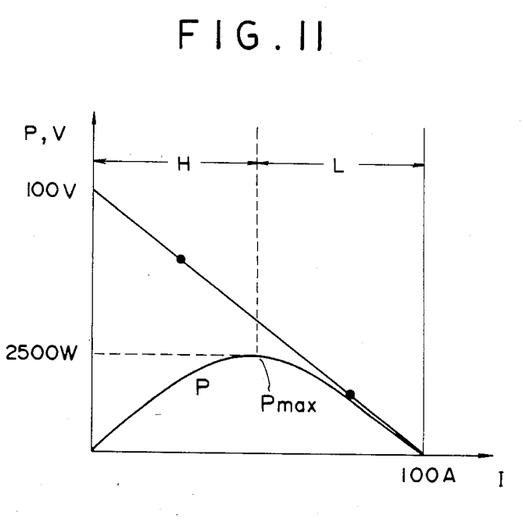
FIG. 11 is a diagram showing a simplified characteristic curves for an easier analysis.
Figure 12A:
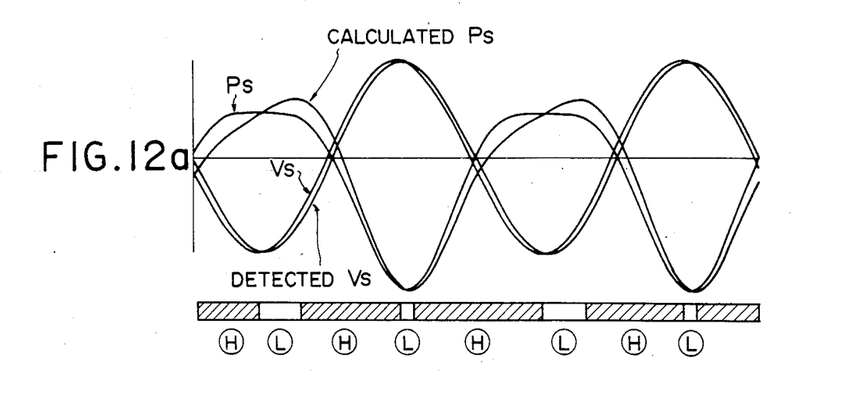
FIGS. 12a and 12b are waveform diagrams showing the detected value and the actual value of the voltage and the power.
Figure 12B:
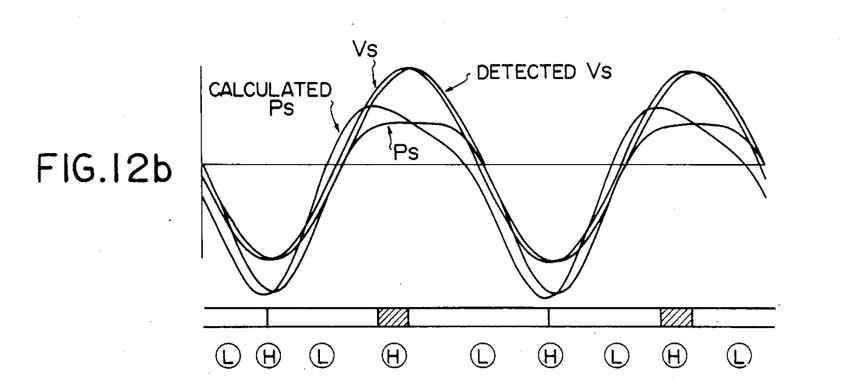

For a better understanding of such a situation, reference is made to FIG. 11, FIG. 12a and FIG. 12b. FIG. 11 shows characteristics of the solar battery deformed from those of FIG. 4 (but with the same tendency being maintained) for a simpler calculation. It is assumed that the inductance of the reactor 10 is 1 mH. The voltage is oscillated at 20 Hz. The amplitude of oscillation is 10 V. When the oscillation is about a point of 60 V (corresponding to 40A), the actual and the detected voltages Vs and the actual and the calculated powers Ps vary as shown in FIG. 12a. On the other hand, when the oscillation is about a point of 40 V (corresponding to 60A), the actual and the detected voltages and the actual and the calculated powers vary as shown in FIG. 12b. In the situation illustrated in FIG. 12a, the operating point is kept within the region "H" (at the left of the maximum power point) with the voltage higher than that corresponding to the maximum power. However, if judgement is made in accordance with the detected voltage and the calculated power, erroneous recognition that the operating point is in the region "L" (at the right of the maximum power point) with the lower voltage is made during the periods indicated by "L" in FIG. 12a. Similarly, erroneous recognition that the operating point is in the region "H" is made during the periods indicated by "H" In FIG. 12b when in fact the operating point is kept in the region "L".

Thus it will be appreciated why erroneous recognition is made when there is a considerable inductance between the solar battery and the point of voltage detection. Similar problems will arise where there is a capacitive component, or a combination of an inductive component and a capacitive component between the solar battery and the point of detection, or where a filter is inserted to smooth the signal of the detectors.

The embodiment which will now be described is intended to solve the above-described problem, i.e., to enable the maximum power tracking even where these is a reactance between the solar battery and the detector or there is a time lag element in the detector. The embodiment is featured by addition of a compensation circuit for compensating the detection error due to the presence of the reactance.

Figure 13:
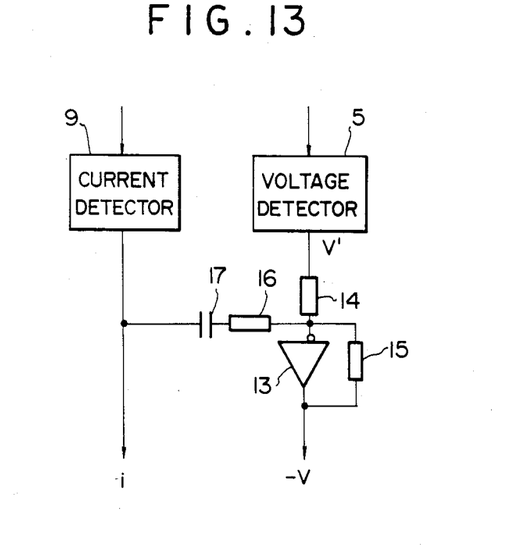
FIGS. 13 and 14 are simplified circuit diagram, each showing part of a control system of an embodiment of the invention.

FIG. 13 shows a part of the control system adapted to compensate the detection error due to the presence of an inductance between the solar battery and the voltage detector.

As illustrated the control system of this embodiment comprises an amplifier circuit connected to receive the output of the voltage detector 5 and comprising an operational amplifier 13, and an input resistor 14, and a series circuit of a resistor 16 and a capacitor 17 connecting the input terminal of the operational amplifier 13 and the output terminal of the current detector 9.

The voltage detector 5 may for example comprise a voltage divider and an insulating amplifier producing a signal indicative of the voltage V' at the position of the voltage detection. The current detector 9 may for example comprise a Hall element and an operational amplifier and produces a signal indicative of the current I. If the voltage at the terminal of the solar battery 1 is represented by V, then $$V = V' + L\, dI/dt \tag{1}$$

where L represents the inductance of the reactor 10. It will be seen that the solar battery voltage V can be obtained by adding the reactance drop to the detected voltage V'. The function of the operational amplifier 13 is to compensate the reactance drop to produce a signal indicative of the voltage V (or in fact −V).

For this purpose, the capacitance C17 of the capacitor 17 and the resistance R15 are so chosen as to satisfy $$L = R15 \times C17$$

Moreover, the resistance R14 of the resistor 14 is made equal to R15.

The value of L can be obtained through measurement or by calculation.

Figure 14:
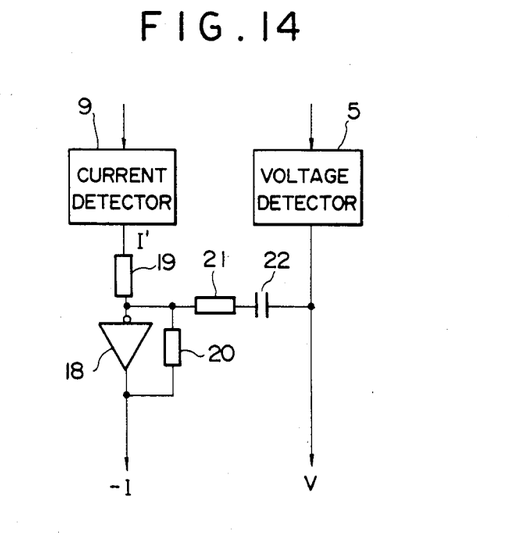

FIG. 14 shows a part of the control system of a further embodiment intended to compensate the detection error due to the presence of a capacitor across the solar battery. As illustrated, the control system comprises an amplifier circuit connected to receive the output of the current detector 9 and comprising an operational amplifier 18, an input resistor 19 and a feedback resistor 20, and a series circuit of a resistor 21 and a capacitor 22 connecting the input terminal of the operational amplifier 18 and the output terminal of the voltage detector 5.

If the voltage and the current of the solar battery are represented by V and I, and the current as detected by the current detector 9 is represented by I', then $$I = I' + C\, dV/dt \tag{2}$$

where C represents the capacitance across the solar battery. It is seen from this equation that the actual current I is given by adding the capacitor current C dV/dt to the detected current I'. For this purpose, the capacitance C22 of the capacitor 22 and the resistance R20 of the resistor 20 are so chosen as to satisfy $$C = R20 \times C22$$

Moreover, the resistance R19 of the resistance 19 is made equal to R20.

Where there are both a reactor and a capacitor at the output of the solar battery, the compensating circuits of FIG. 13 and FIG. 14 may be combined.

Where there is provided a time lag element in the detector, the entire system is equivalent to a situation where there are a reactor and a capacitor at the output of the solar battery, so that the same combination as described above can be utilized.

In the various embodiment described, a circuit including an operational amplifier is used as a compensating circuit, but an equivalent calculation can be accomplished by a suitably programmed computer such as a microcomputer, in which case the output of the detectors can be inputted directly into the computer.

As has been described, according to the embodiments described with reference to FIG. 13 and FIG. 14, the effect of the presence of a reactance between the solar battery and the detectors or of a time lag element in the detectors can be eliminated and the maximum power tracking is achieved in spite of the presence of such a reactance or the time lag element. Moreover, the control response is improved.

What is claimed is:

1. A method of controlling a photovoltaic power system including a solar battery and a power converter receiving the output of the solar battery and being controlled in such a manner that the voltage of the solar battery is kept at a voltage reference which is determined in accordance with the operating condition of the system thereby to maximize the power of the solar battery, said method comprising
   judging whether each of the voltage and the power of the solar battery, which are controlled by said voltage reference, is increasing or decreasing,
   switching, when the power is found to be decreasing and the voltage is found to be increasing, to a first mode in which the voltage reference is decreased, and
   switching, when the power and the voltage are both found to be decreasing, to a second mode in which the voltage reference is increased.

2. A method of claim 1, wherein said step of judging comprises periodically determining the instantaneous values of the voltage and the power and comparing the values determined at a current time with values at a preceding determination time.

3. A method of claim 1, wherein during the first mode, the voltage reference is periodically decreased by a predetermined value and during the second mode, the voltage reference is periodically increased by a predetermined value.

4. A method of claim 1, further comprising the step of detecting, by use of detecting means, the voltage and the current at the input of the power converter, and compensating detection error due to the presence of a reactance between the solar battery and the point at which the voltage or the current is detected or a time lag element in the detecting means, to produce compensated signals indicative of the voltage and the current of the solar battery, wherein the judgement in said step of judging is made in accordance with the compensated signals.

5. A method of claim 4, wherein the photovoltaic power system has an inductance between the solar battery and the point at which the voltage is detected, and said step of compensating comprises determining the voltage V of the solar battery in accordance with the following equation $$V = V' + L\,dI/dt$$

where V' represents the voltage detected at the input of the power converter,

I represents the current, and

L represents the inductance between the solar battery and the point at which the voltage is detected.

6. A control system for controlling a photovoltaic power system including a solar battery and a power converter receiving the output of the solar battery and being controlled in such a manner that the voltage of the solar battery is maintained at a voltage reference which is determined in accordance with the operating condition of the photovoltaic system thereby to maximize the power of the solar battery, said control system comprising means for judging whether each of the voltage and the power of the solar battery is increasing or decreasing, selecting means for selecting one of a first mode in which the voltage reference is decreased and a second mode in which the voltage reference is increased, means responsive to the judging means for switching the selecting means to select the first mode when the power is found to be decreasing and the voltage is found to be increasing, and switching the selecting means to select the second mode when the power and the voltage are both found to be decreasing, and means for controlling the power converter in such a manner that the voltage is maintained at the voltage reference.

7. A system of claim 6, wherein said judging means comprises means periodically determining the instantaneous values of the voltage and the power, and means comparing the values determined at a current time with the values determined at a preceding determination time point to make the judgement.

8. A system of claim 6, further comprising means for periodically decreasing the voltage reference by a predetermined value during the first mode, and means for periodically increasing the voltage reference by a predetermined value during the second mode.

9. A system of claim 1, further comprising means for detecting the voltage and the current at the input of the power converter, and means for compensating detection error due to the presence of a reactance between the solar battery and the point at which the voltage or the current is detected or a time lag element in the detecting means, to produce compensated signals indicative of the voltage and the current of the solar battery, wherein said judging means makes the judgement in accordance with the compensated signals.

10. A system of claim 9, wherein the photovoltaic power system has an inductance between the solar battery and the point at which the voltage is detected, and said compensating means comprises means for determining the voltage V of the solar battery in accordance with the following equation $$V = V' + L\,dI/dt$$

where V' represents the voltage detected at the input of the power converter,

I represents the current, and

L represents the inductance between the solar battery and the point at which the voltage is detected.

11. A method of controlling a photovoltaic power system including a solar battery and a power converter receiving the output of the solar battery, comprising detecting by use of detecting means the voltage and the current at the input of the power converter, compensating detection error due to the presence of a reactance between the solar battery and the point at which the voltage or the current is detected or a time lag element in said detecting means to produce compensated signals indicative of the voltage and the current of the solar battery, and controlling the power converter, in accordance with the compensated signals, in such a manner as to maximize the power of the solar battery.

12. A method of claim 11, wherein the photovoltaic power system has an inductance between the solar battery and the point at which the voltage is detected, and said step of compensating comprises determining the voltage V of the solar battery in accordance with the following equation $$V = V' + L\,dI/dt$$

where V' represents the voltage detected at the input of the power converter,

I represents the current, and

L represents the inductance between the solar battery and the point at which the voltage is detected.

13. A method of claim 11, further comprising the steps of judging whether the voltage and the power of the solar battery is increasing or decreasing, switching, when the power is found to be decreasing and the voltage is found to be increasing, to a first mode in which the voltage reference is decreased, and switching, when the power and the voltage are both found to be decreasing to a second mode in which the voltage reference is increased.

14. A method of claim 13, wherein said step of judging comprises periodically determining the instantaneous values of the voltage and the power and comparing the values determined at a particular determination time point with the values determined at a preceding determination time point to make the judgement.

15. A method of claim 14, wherein during the first mode, the voltage reference is periodically decreased by a predetermined value and during the second mode, the voltage reference is periodically increased by a predetermined value.

16. A control system for controlling a photovoltaic power system including a solar battery, and a power converter receiving the output of the solar battery, said control system comprising means for detecting the voltage and the current at the input of the power converter, means responsive to the detected voltage and the detected current for compensating detection error due to the presence of a reactance between the solar battery and the point at which the voltage or the current is detected or a time lag element in said detecting means to produce compensated signals indicative of the voltage and the current of the solar battery, and means responsive to the compensated signals for controlling the power converter in such a manner as to maximize the power of the solar battery.

17. A system of claim 16, wherein the phtovoltaic power system has an inductance between the solar battery and the point at which the voltage is detected, and said compensating means cmprises means for determining the voltage V of the solar battery in accordance with the following equation $$V = V' + L\, dI/dt$$

where V' represents the voltage detected at the input of the power converter,

I represents the current, and

L represents the inductance between the solar battery and the point at which the voltage is detected.

18. A system of claim 16, further comprising means for judging whether the voltage and the power of the solar battery is increasing or decreasing, selecting means for selecting one of a first mode in which the voltage reference is decreased and the second mode in which the voltage reference is increased, means responsive to the judging means for switching the selecting means to select the first mode when the power is found to be decreasing and the voltage is found to be increasing, and switching the selecting means to select the second mode when the power and the voltage are both found to be decreasing, and means for controlling the power converter in such a manner that the voltage is maintained at the voltage reference.

19. A system of claim 18, wherein said judging means comprises means periodically determining the instantaneous values of the voltage and the power, and means comparing the values determined at a particular determination time point with the values determined at a preceding determination time point to make the judgement.

20. A system of claim 18, further comprising means for periodically decreasing the voltage reference by a predetermined value during the first mode, and means for periodically increasing the voltage reference by a predetermined value during the second mode.

* * * * *